US005696939A

United States Patent [19]
Iacobovici et al.

[11] Patent Number: 5,696,939
[45] Date of Patent: Dec. 9, 1997

[54] APPARATUS AND METHOD USING A SEMAPHORE BUFFER FOR SEMAPHORE INSTRUCTIONS

[75] Inventors: Sorin Iacobovici; Dean A. Mulla, both of San Jose, Calif.

[73] Assignee: Hewlett-Packard Co., Palo Alto, Calif.

[21] Appl. No.: 536,534

[22] Filed: Sep. 29, 1995

[51] Int. Cl.$^6$ .................................................. G06F 12/00
[52] U.S. Cl. ............................................................ 395/477
[58] Field of Search .......................... 364/DIG. 1 MS File, 364/DIG. 2 MS File; 395/616, 617, 680, 280, 287, 288, 299, 401, 444, 445, 474, 477, 479, 483, 490, 726

[56] References Cited

U.S. PATENT DOCUMENTS

| | | | |
|---|---|---|---|
| 5,050,070 | 9/1991 | Chastain et al. | 395/379 |
| 5,050,072 | 9/1991 | Earnshaw et al. | 395/288 |
| 5,179,665 | 1/1993 | Roslund et al. | 395/200.08 |
| 5,261,106 | 11/1993 | Lentz et al. | 395/726 |
| 5,276,886 | 1/1994 | Dror | 395/728 |
| 5,339,443 | 8/1994 | Lockwood | 395/732 |
| 5,367,690 | 11/1994 | Schiffleger | 395/421.03 |
| 5,394,551 | 2/1995 | Holt et al. | 395/726 |
| 5,428,783 | 6/1995 | Lake | 395/676 |
| 5,434,970 | 7/1995 | Schiffleger | 395/200.08 |
| 5,594,888 | 1/1997 | Moyer et al. | 395/495 |

*Primary Examiner*—Robert B. Harrell
*Attorney, Agent, or Firm*—Jack A. Lenell

[57] ABSTRACT

A simplified semaphore method and apparatus for simultaneous execution of multiple semaphore instructions and for enforcement of necessary ordering. A central processing unit having an instruction pipeline is coupled with a data cache arrangement including a semaphore buffer, a data cache, and the semaphore execution unit. An initial semaphore instruction having one or more operands and a semaphore address are transmitted from the instruction pipeline to the semaphore buffer, which in turn are transmitted from the semaphore buffer to the semaphore execution unit. The semaphore address of the initial semaphore instruction is transmitted from the instruction pipeline to the data cache to retrieve initial semaphore data stored within the data cache at a location in a data line of the data cache as identified by the semaphore address. The semaphore instruction is executed within the semaphore execution unit by operating upon the initial semaphore data and the one or more semaphore operands so as to produce processed semaphore data, which is then stored within the data cache. Since the semaphore buffer provides for entries of multiple semaphore instructions, the semaphore buffer initiates simultaneous execution of multiple semaphore instructions, as needed.

9 Claims, 2 Drawing Sheets

APPARATUS AND METHOD USING A SEMAPHORE BUFFER FOR SEMAPHORE INSTRUCTIONS

FIELD OF THE INVENTION

The present invention relates to computer systems, and more particularly relates to a computer system implementation for providing efficient management of semaphore operations in a multiprocessor system.

BACKGROUND OF THE INVENTION

In a multiprocessor system, many processors require access to data that is shared by the processors. If serializing precautions are not taken, there is a possibility of "data tearing" when one processor writes to an area of memory while it is being read by another processor. If this situation exists, it is possible that the processor reading the memory actually reads the "torn" pieces of two separate data values.

Semaphore instructions are serializing instructions used to acquire shared data in the multiprocessor system, without any "data tearing". Semaphore operations carried out by execution of these instructions provide atomic read-modify-write, ordered memory accesses.

In some multiprocessor systems, semaphore operations use to atomic access a main memory. Although various processors of the system usually share access to the main memory over a system bus, a processor locks the system bus while performing the semaphore operations to provide for the atomic accesses to main memory. System performance is degraded because while the system bus is locked, it is not available for use by other processors of the system.

Additionally, in some systems, semaphore instructions are executed by a processor's instruction pipeline. However, hardware needed for execution of some sophisticated semaphore instructions adds undesirable complexity to the pipeline. Furthermore, performance is also affected negatively due to resource conflicts between the semaphore instructions and other instructions executing in the pipeline. In particular, multiple semaphore instructions can not execute in the pipeline simultaneously.

What is needed is a simplified semaphore method and apparatus for simultaneous execution of multiple semaphore instructions and for enforcement of necessary ordering.

SUMMARY OF THE INVENTION

The present invention provides a simplified semaphore method and apparatus for simultaneous execution of multiple semaphore instructions and for enforcement of necessary ordering. As discussed in further detail subsequently herein, a semaphore buffer of the present invention simplifies support of semaphore instructions by providing for the semaphore instructions (including fairly sophisticated ones such as Fetch-and-Add or Compare-and-Swap) to be executed within a data cache arrangement, rather than within a central processing unit pipeline, and by allowing multiple semaphore instructions to execute simultaneously, provided that the simultaneous execution is consistent with necessary ordering enforced for these semaphore instructions. Furthermore, executing semaphore instructions within the data cache arrangement of the invention enhances system performance because semaphore operations do not use atomic accesses to main memory, and the system bus is not locked during semaphore operations.

Briefly, and in general terms, the invention includes the central processing unit having the instruction pipeline coupled with the data cache arrangement, which includes a semaphore buffer, a data cache, and a semaphore execution unit. For example, an initial semaphore instruction having one or more operands and a semaphore address is transmitted from the instruction pipeline to the semaphore buffer, which in turn is transmitted from the semaphore buffer to the semaphore execution unit. The semaphore address of the initial semaphore instruction is transmitted from the instruction pipeline to the data cache to retrieve initial semaphore data stored within the data cache at a location in a data line of the data cache as identified by the semaphore address. For most semaphore instructions, this initial semaphore data is returned to the pipeline, in order to update destination registers.

One of the semaphore buffer's functions is to store the semaphore instruction's operands and wait for a read part of the cache memory access to complete. Upon completion of the read part of the data cache access, the initial semaphore data is transmitted from the data cache to the semaphore execution unit. The semaphore instruction is executed within the semaphore execution unit by operating upon the initial semaphore data and the one or more semaphore operands so as to produce processed semaphore data, which is then stored within the data cache at the location in the data line identified by the semaphore address of the initial semaphore instruction. Since the semaphore buffer provides for entries of multiple semaphore instructions, the semaphore buffer initiates simultaneous execution of multiple semaphore instructions, as needed.

In general, the semaphores' data cache accesses are Read-Modify-Write. As the semaphore operation is a Read-Modify-Write operation, another semaphore buffer function is to monitor for dependency conditions and to enforce necessary ordering of some semaphore instructions. A dependency condition is detected when there is a dependency between a previous store and a subsequent load. As mentioned, the loads are usually executed ahead of previous stores in high performance processors, so the detection of dependency conditions is crucial for the correct operation of the processor. No store-fetch bypass can be done in this case, because the semaphore's store data is available only much later, so detection of this dependency condition by control logic of the semaphore buffer causes it to interlock the pipeline.

Other aspects and advantages of the present invention will become apparent from the following detailed description, taken in conjunction with the accompanying drawings, illustrating by way of example the principles of the invention.

DETAILED DESCRIPTION OF PREFERRED EMBODIMENT

Figure 1:
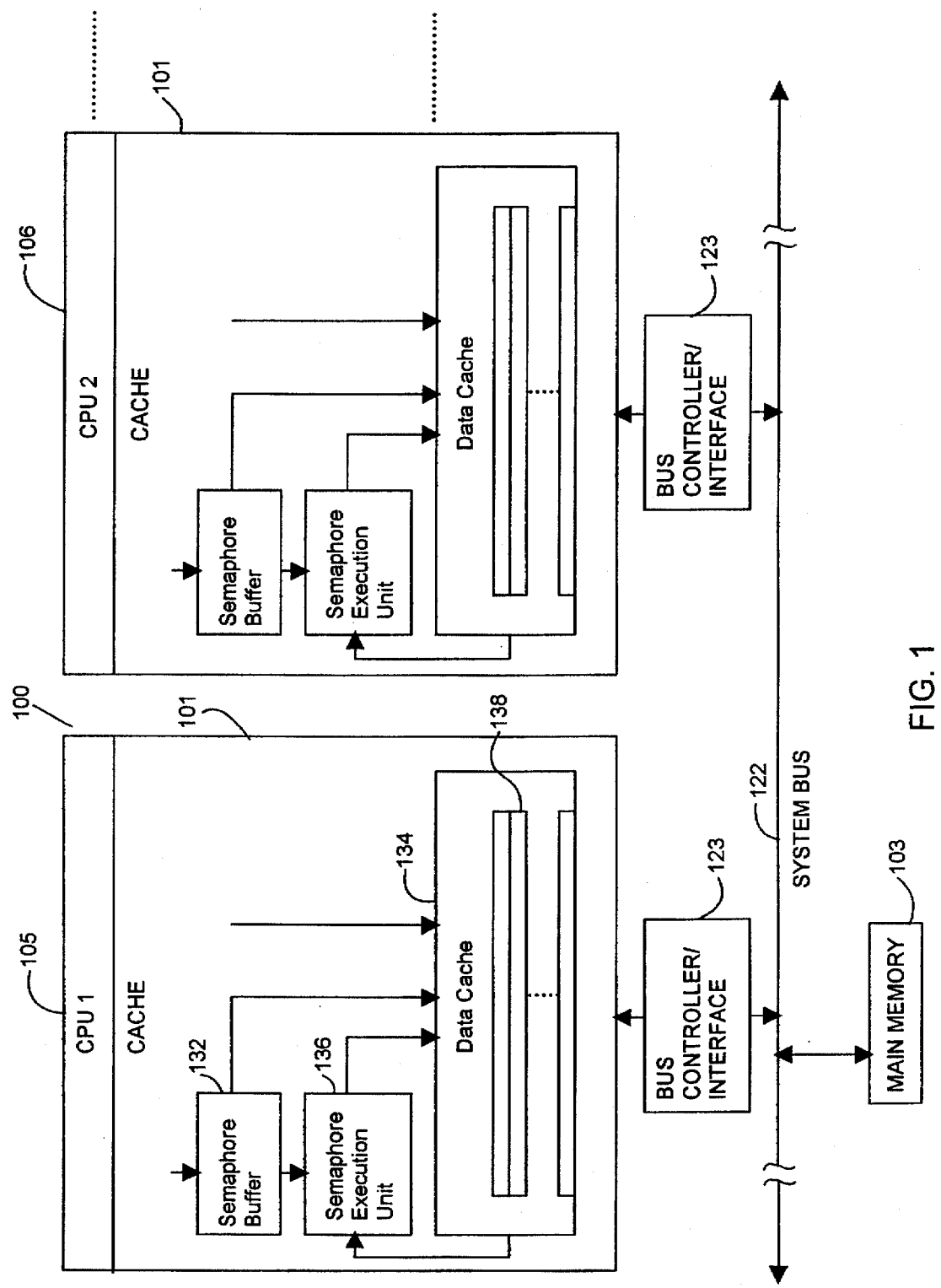
FIG. 1 is a simplified partial block diagram of a preferred embodiment of the invention.

FIG. 1 is a simplified partial block diagram of a preferred embodiment of the invention. A multiprocessor system 100 employs a plurality of preferred cache arrangements 101 of the invention for efficient management of semaphore operations in the multiprocessor system. Each cache arrangement provides high-speed memory coupled between main memory 103 and a respective first and second central processing unit (CPU) 105, 106. A system bus 122 is controlled by a respective bus controlled interface 123 coupled with each of the central processing units.

Each central processing unit has a respective instruction pipeline coupled with the respective data cache arrangement, which include a semaphore buffer 132, a data cache 134 of high speed memory, and a semaphore execution unit 136. An initial semaphore instruction having one or more operands and a semaphore address are transmitted from the instruction pipeline to the semaphore buffer 132, which in turn is transmitted from the semaphore buffer 132 to the semaphore execution unit 136. The semaphore address of the initial semaphore instruction is transmitted from the instruction pipeline to the data cache 134 to retrieve an initial semaphore data stored within the data cache at a location in a data line 138 as identified by the semaphore address.

Upon completion of the read part of the data cache access, the initial semaphore data is transmitted from the data cache 134 to the semaphore execution unit 136. The semaphore instruction is executed within the semaphore execution unit 136 by operating upon the initial semaphore data and the one or more semaphore operands so as to produce processed semaphore data, which is stored within the data cache at the location in the data line 138 identified by the semaphore address. It should be understood that although operation of the invention upon the initial semaphore instruction is discussed in detail herein, the semaphore buffer 132 of the invention provides for entries of multiple semaphore instructions, and initiates simultaneous execution of multiple semaphore instructions, as needed.

Figure 2:
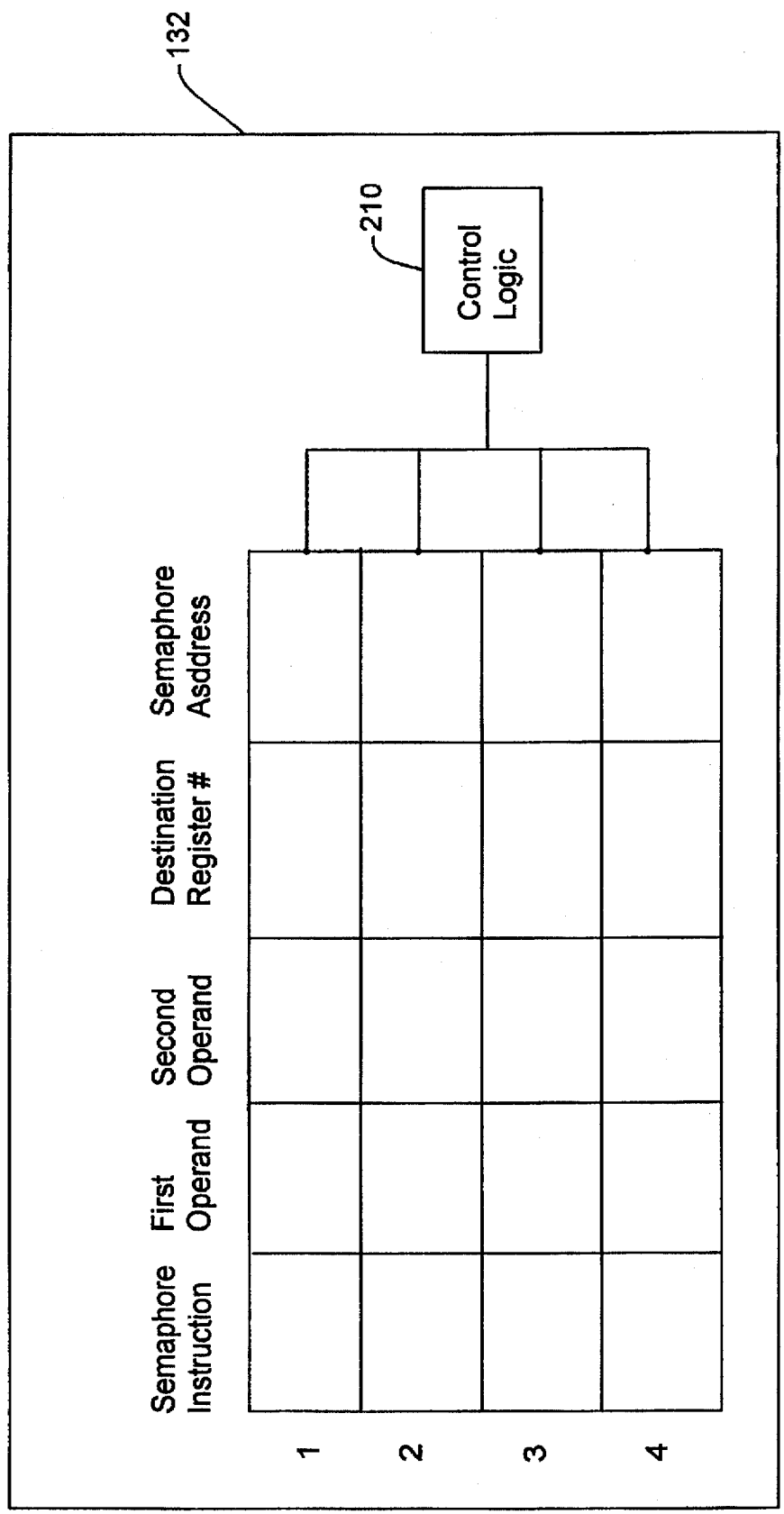
FIG. 2 is a detailed partial block diagram of a semaphore buffer shown in the preferred embodiment of FIG. 1.

FIG. 2 is a detailed partial block diagram of the semaphore buffer 132 of the preferred embodiment shown in FIG. 1. As shown in FIG. 2, the semaphore buffer 132 of the invention provides four entries, which provide for initiating simultaneous execution of four semaphore instructions. In alternative embodiments, two entries, three entries, or more than four entries are provided for simultaneous execution of a different number of semaphore instructions. In the preferred embodiment, each of the entries provides for storage of respective semaphore entries, first operands, second operands, destination registers numbers, and semaphore addresses.

Control logic 210 of the semaphore buffer 132 initiates the execution of the semaphore instructions, once their initial data is returned by the data cache. In the preferred embodiment, the control logic initiates simultaneous execution of semaphore instructions by using the semaphore buffer to store a subsequent semaphore instruction and to initiate execution of the subsequent semaphore instruction before the processed semaphore data of the initial semaphore instruction is stored in the data cache, subject to ordering constraints.

Additionally, the control logic 210 of the semaphore buffer generates the interlock signal, as needed, to enforce necessary dependency and ordering of some instructions. In the preferred embodiment of the invention, upon transmitting to the semaphore buffer 132 a subsequent semaphore instruction having a semaphore address, comparator circuitry in the control logic 310 of the semaphore buffer 132 generates an interlock signal if the processed semaphore data of the initial semaphore instruction is not yet stored in the data cache 134, and if the data line 138 identified by the semaphore address of the initial semaphore instruction is the same as a data line 138 identified by the semaphore address of the subsequent semaphore instruction.

Similarly, upon transmitting to the semaphore buffer 132 a subsequent load or store instruction having an address, the semaphore buffer generates the interlock signal if the processed semaphore data of the initial semaphore instruction is not yet stored in the data cache 134, if the data line identified by the semaphore address of the initial semaphore instruction is the same as a data line identified by the address of the subsequent load or store instruction, and if there is any byte overlap between the location in the data line identified by the semaphore address of the initial semaphore instruction and a location in the data line, as identified by the address of the subsequent load or store instruction. In any case, the instruction pipeline is interlocked in response to the interlock signal until the processed semaphore data of the initial semaphore instruction is stored in the data cache 134.

Furthermore, in accordance with the principles of the invention, if the semaphore instruction is a Fetch-and-Add instruction the one or more operands includes a first operand, and the step of executing the semaphore instruction includes adding the first operand to the initial semaphore data so as to produce the processed semaphore data.

Additionally, if the semaphore instruction is a Compare-and-Exchange instruction, then the one or more operands includes a first operand and a second operand and the step of executing the semaphore instruction includes comparing the first operand to the initial semaphore data so as to determine whether the first operand value is equal to the initial semaphore data. The step of storing the processed semaphore data includes storing the second operand as the processed semaphore data if the first operand is equal to the initial semaphore data. If the first operand is not equal to the initial semaphore data, then the initial semaphore data becomes the processed semaphore data without being changed, and there is no need to store the processed semaphore data. However, it should be understood that to provide ease of hardware implementation, in some embodiments, the processed semaphore data is stored regardless of whether or not it is different from the initial semaphore data.

The present invention provides a simplified semaphore method and apparatus for simultaneous execution of multiple semaphore instructions and for enforcement of necessary ordering. Although specific embodiments of the invention have been described and illustrated, the invention is not to be limited to the specific forms or arrangements of parts so described and illustrated, and various modifications and changes can be made without departing from the scope and spirit of the invention. Within the scope of the appended claims, therefor, the invention may be practiced otherwise than as specifically described and illustrated.

What is claimed is:

1. A method comprising the steps of:
providing a central processing unit having an instruction pipeline;
providing a data cache arrangement including a semaphore buffer, a data cache, and a semaphore execution unit;
transmitting an initial semaphore instruction having one or more semaphore operands and a semaphore address from the instruction pipeline to the semaphore buffer;
transmitting the semaphore address of the initial semaphore instruction to the data cache;
retrieving initial semaphore data stored within the data cache at a location in a data line as identified by the semaphore address of the initial semaphore instruction;
transmitting the initial semaphore data from the data cache to the semaphore execution unit;
transmitting the initial semaphore instruction and the one or more semaphore operands from the semaphore buffer to the semaphore execution unit;

executing the initial semaphore instruction within the semaphore execution unit by operating upon the initial semaphore data and the one or more semaphore operands so as to produce processed semaphore data; and completing execution of the initial semaphore instruction by storing the processed semaphore data within the data cache at the location in the data line identified by the semaphore address of the initial semaphore instruction.

2. A method as in claim 1 further comprising:

transmitting a subsequent semaphore instruction having a semaphore address from the instruction pipeline to the semaphore buffer; and using the semaphore buffer to generate an interlock signal if the processed semaphore data of the initial semaphore instruction is not yet stored in the data cache and if the data line identified by the semaphore address of the initial semaphore instruction is the same as a data line identified by the semaphore address of the subsequent semaphore instruction;

interlocking the instruction pipeline in response to the interlock signal until the processed semaphore data is stored in the data cache.

3. A method as in claim 1 further comprising:

transmitting a subsequent load instruction having an address from the instruction pipeline to the semaphore buffer; and using the semaphore buffer to generate an interlock signal,
if the processed semaphore data of the initial semaphore instruction is not yet stored in the data cache,
if the data line identified by the semaphore address of the initial semaphore instruction is the same as a data line identified by the address of the subsequent load instruction, and
if there is any byte overlap between the location in the data line identified by the semaphore address of the initial semaphore instruction and a location in the data line as identified by the address of the subsequent load instruction; and interlocking the instruction pipeline in response to the interlock signal until the processed semaphore data is stored in the data cache.

4. A method as in claim 1 further comprising:

transmitting a subsequent store instruction having an address from the instruction pipeline to the semaphore buffer; and using the semaphore buffer to generate an interlock signal,
if the processed semaphore data of the initial semaphore instruction is not yet stored in the data cache,
if the data line identified by the semaphore address of the initial semaphore instruction is the same as a data line identified by the address of the subsequent load instruction, and
if there is any byte overlap between the location in the data line identified by the semaphore address of the initial semaphore instruction and a location in the data line as identified by the address of the subsequent load instruction; and interlocking the instruction pipeline in response to the interlock signal until the processed semaphore data is stored in the data cache.

5. A method as in claim 1 wherein:

the semaphore instruction is a fetch and add instruction;
the one or more operands includes a first operand; and the step of executing the semaphore instruction includes adding the first operand to the initial semaphore data so as to produce the processed semaphore data.

6. A method as in claim 1 wherein:

the semaphore instruction is a compare and exchange instruction;

the one or more operands includes a first operand and a second operand;

the step of executing the semaphore instruction includes comparing the first operand to the initial semaphore data so as to determine whether the first operand value is equal to the initial semaphore data; and the step of storing the processed semaphore data includes storing the second operand as the processed semaphore data if the first operand is equal to the initial semaphore data.

7. A method comprising the steps of:

providing a data cache arrangement including a semaphore buffer, a data cache, and a semaphore execution unit;

storing in the semaphore buffer an initial semaphore instruction having a semaphore address;

retrieving initial semaphore data stored within the data cache;

executing the initial semaphore instruction within the execution unit by operating upon the initial semaphore data so as to produce processed semaphore data; and initiating simultaneous execution of semaphore instructions by using the semaphore buffer to store a subsequent semaphore instruction and to begin execution of the subsequent semaphore instruction before the processed semaphore data of the initial semaphore instruction is stored in the data cache.

8. A method as in claim 7 further comprising the step of completing execution of the initial semaphore instruction by storing the processed semaphore data within the data cache.

9. An apparatus comprising:

a central processing unit including an instruction pipeline for providing a semaphore instruction having one or more semaphore operands and a semaphore address; and a data cache arrangement including:
a semaphore buffer coupled with the instruction pipeline for receiving the semaphore instruction and the semaphore operand;
a data cache coupled with the instruction pipeline for receiving the semaphore address and for providing initial semaphore data stored within the data cache in a data line as identified by the semaphore address;
a semaphore execution unit coupled with the semaphore buffer for receiving the semaphore instruction and the semaphore operand, and coupled with the data cache for receiving the initial semaphore data, the semaphore execution unit being adapted for executing the semaphore instruction by operating upon the initial semaphore data and the one or more operands so as to produce processed semaphore data and adapted for storing the processed semaphore data back in the data line identified by the semaphore address.

* * * * *